United States Patent Office 2,879,264
Patented Mar. 24, 1959

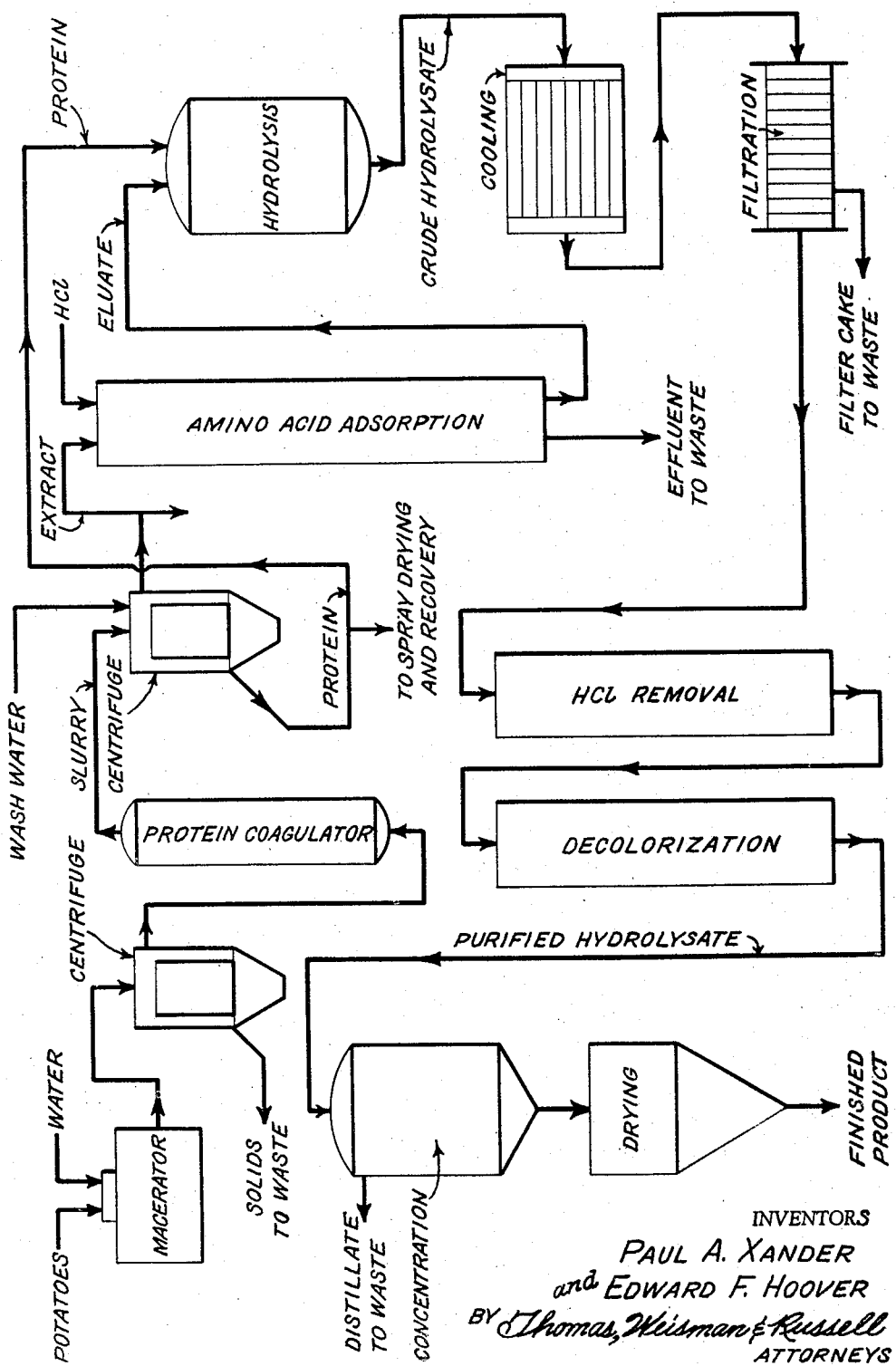

2,879,264
METHOD OF PRODUCING PROTEIN AND PROTEIN HYDROLYSATE FROM POTATOES AND POTATO WASTE

Paul A. Xander, Nescopeck, and Edward F. Hoover, Berwick, Pa., assignors to Wise Potato Chip Company, Berwick, Pa., a corporation of Pennsylvania Application May 14, 1957, Serial No. 658,986

6 Claims. (Cl. 260—112)

This invention relates to a method of producing purified protein and/or a mixture of purified amino acids using as the source materials potatoes or waste by-products obtained from potato processing industries.

In the Paul A. Xander Patent No. 2,666,080, January 12, 1954, there is disclosed a process for producing protein hydrolysate and amino acids from potato materials. The present invention involves improvements in and variations of said Xander process whereby to obtain potato protein and/or amino acids in a more highly purified form and in an efficient and economical manner.

An object of this invention is to provide a purified vegetable protein hydrolysate of exceptional nutritive value and exceedingly low mineral salt content suitable for use as a dietary supplement for animal or human nutrition and as a flavoring agent for improving the quality and flavor of potato chips and similar products.

Another important object of the present invention is to provide a process for extracting essentially all of the proteins, amino acids, and amides from potatoes or potato waste and treating the extracted material in an efficient and continuous manner so as to produce a uniform solid or crystalline mixture of purified amino acids which is essentially free of sugars, mineral acids, and inorganic salts.

Still another objective of the present process is to provide a purified vegetable protein product of high nutritional importance suitable for cattle or human food supplements and also suitable for non-food uses such as adhesives, plastics, etc.

Other objects and advantages of the invention will appear from the more detailed description thereof, the process being illustrated by the accompanying diagrammatic flow-sheet drawing depicting the various steps of the process.

Our process involves the extraction and utilization of the protein and amino acids and amides present in the potato water or aqueous solution formed in the maceration of potatoes or potato waste in the presence of water. The liquid portion of the resultant slurry is separated and heated to coagulate or denature the proteins present therein, the proteins being then separated by centrifuging or other means. The protein-free liquid is passed through an ion exchange resin where the free amino acids and amides present in the liquid are adsorbed. These compounds are eluted from the column with dilute mineral acid and, in a preferred form of the invention, the acidic effluent is combined with at least a portion of the proteins previously separated by heating and centrifuging. The acidic mixture thus formed is then hydrolyzed at elevated temperatures whereby the proteins are decomposed into their component amino acids. The resultant crude amino acid solution is purified by passing it in turn through an anion exchange resin wherein the excess mineral acid is removed and then through a decolorizing ion exchange resin where the dark colored organic compounds formed during hydrolysis are removed. The resultant colorless, purified amino acid solution is distilled under reduced pressure to decrease the volume and then finally dried to yield a solid, crystalline tan protein hydrolysate product which is practically free of sugars, mineral acids, and inorganic salts.

Our invention is not restricted to a process including all of the aforementioned steps inasmuch as certain parts of the process are useful operations in themselves. For example, the protein which is precipitated by the heat coagulation is a useful and desirable material and may be recovered as such or in dried form while discarding the supernatant liquid. Preferably, however, all or a portion of the protein is further treated in the process to obtain a purified protein hydrolysate therefrom. Also, where the precipitated protein is removed from the process following the coagulating step, it is a useful operation to treat only the supernatant liquid in subsequent steps of the process to recover its amino acid and amide content.

While the present process is applicable to whole raw potatoes, it is also very suitable for use with all forms of raw potato waste having their origin with the potato chip industry, starch manufacturing, or other industrial operations using potatoes as a source of raw material.

Describing the complete process more specifically, whole potatoes or solid potato waste are first macerated in a hammer mill or other suitable disintegrator until the solids are reduced to a size equivalent to 60 to 100 mesh. Water is added either during or immediately following disintegration at a ratio ranging from 1 to 2 pounds of waste per pound of water used. A thin slurry is thus formed. The insoluble solid portion of the slurry consists of starch, fiber, and outer cortical tissue of the potatoes, all of which are separated from the slurry by centrifuging. The solids are of no significance in the present process and may be discarded.

The liquid fraction of the slurry contains all of the water soluble components of the potatoes or potato waste used. This includes proteins, amino acids, amides, sugars, enzymes, mineral salts, organic acids, and other lesser groups of compounds. It ranges in color from red to grey or even black due to enzymatic or oxidative reactions and exhibits a pH value of from 5.0 to 7.0 depending upon the acidity of the raw material used.

Alternately, in place of whole potatoes or potato waste, the process may be started with any potato water or solution containing the protein, amino acid and amide content of potatoes, for example, the commonly known "protein water" waste from the potato starch industry. This material has as its source the starch slurry obtained after the original grinding of potatoes in the starch recovery process. It contains all of the soluble components of potatoes, just as does the crude liquid extract prepared as described above from solid waste. Because of the extremely high B.O.D. (biological oxygen demand) of this waste, it has presented a formidable problem of stream pollution in the past. Recovery of proteins, amino acids, and amides from this material by the process described herein significantly reduces the B.O.D. of the waste water.

The liquid extract containing this multitude of soluble components is passed into a heat exchanger, or other suitable apparatus capable of heating it to a temperature of from about 75° C. to about 95° C. This treatment partially denatures the proteins present in the extract and causes them to separate in the form of a heavy white to grey colored flocculent insoluble precipitate. The precipitated proteins are recovered from the extract by centrifuging or by allowing them to settle in a suitable holding vessel and decanting the supernatant liquid. Centrifuging is preferred since it is more time saving than the settling operation and results in better and more complete separation of the liquid portion of the extract from the protein floc. The separated protein precipitate is washed, either in place in the centrifuge or by reslurrying in a mixing tank, with water acidified to pH 5.0 or below by the addition of small quantities of hydrochloric acid (2 gallons of acid per 1000 gallons of water). The acidified water aids in maintaining the flocculent nature of the protein precipitate since, in water which has not been acidified, the protein tends to form a semicolloidal suspension which cannot be easily separated. The use of dilute acid for washing further aids in the purification of the protein in that it dissolves and removes significant quantities of occluded inorganic salts which are present in the unwashed protein floc. Adequate washing is obtained if 20 to 60 volumes of acidified water are used per volume of wet protein recovered from the extract. Spent washings are discarded. The washed protein precipitate, after being freed of excess residual wash water, is reslurried with fresh water to form a thin slurry. Two to four volumes of water per volume of protein are sufficient for this. The thin slurry is formed in a suitably sized mixing tank. In a preferred modification of the invention, the protein slurry is transferred from the mixing tank to a corrosion resistant, pressurized reactor where it is mixed with amino acids and amides which, as will be described presently, are recovered from the liquid extract remaining after coagulation of the proteins.

The potato protein obtained as hereinbefore described is itself a useful product and hence may be recovered as such in whole or in part. To that end, in another modification of the process, all or a portion of the aforementioned protein slurry may be dried by spray drying or other means so as to prevent decomposition of the proteins. The purified dried protein product thus obtained is tan to grey in color and is essentially free of inorganic salts (less than 2%). The total nitrogen content ranges from 12 to 15 percent by weight.

Recovery of the dried protein product ranges from 0.5 to 1.25 percent by weight of the potatoes or raw waste treated. The material is insoluble in water, dilute acids, and organic solvents but slightly soluble in dilute alkali. It is non-hygroscopic and is easily stored without decomposition. The material is composed of all protein fractions of potatoes which are denatured and rendered insoluble by heat under the conditions specified.

The supernatant liquid extract remaining after removal of the heat coagulated proteins as described above is deep red in color and exhibits a pH value of 5.0 to 7.0. It contains amino acids and amides plus all other soluble constituents such as sugars, enzymes, and mineral salts which were extracted from the original raw potato material. Since the soluble nitrogenous components (amino acids and amides) form a substantial portion (30 to 70 percent) of the total nitrogen of the potato, recovery of these compounds, in addition to the proteins already recovered, is desired in order to obtain a higher yield of the end product of this process.

However, inasmuch as the liquid extract containing the amino acids and amides is contaminated with significant quantities of sugars, mineral salts, and other materials which would be undesirable in a high quality protein hydrolysate such as is produced by this invention, it is desirable to treat the extract in such a manner as to eliminate the unwanted compounds.

Separation of the amino acids and amides from the contaminants is accomplished by adsorbing the former on an ion exchange resin of the strongly basic anion exchanger type. In practice Dowex 1, a synthetic resin manufactured by the Dow Chemical Company, Midland, Michigan, composed of a styrene-divinylbenzene copolymer containing quaternary ammonium groups as the functional or exchange groups, is most suitable for this purpose. Inasmuch as a number of variations of this resin are commercially available according to the crosslinkage or ratio of styrene to divinylbenzene content, the most suitable product is that which is 7.5 percent crosslinked and is designated by the manufacturer as Dowex 1–X7.5. Particle size of the resin is of importance in the mechanical operation of the process since flow rates of solution through a resin bed are grossly influenced by the particle size. Therefore, resin having a particle size ranging from 20 to 50 mesh is preferred.

Another synthetic resin which is suitable for adsorbing amino acids and amides from potato extracts is Duolite A-40, a monofunctional, strongly basic anion exchange resin based upon an aromatic matrix and having quaternary ammonium groups as the functional centers. Duolite A-40 is manufactured by the Chemical Process Company, Redwood City, California.

In practice, the dark colored, protein-free supernatant extract is passed downwardly through an appropriately sized column of the anion exchange resin which has been previously regenerated to the hydroxyl or free base form with caustic alkali. A flow rate of 1 to 3 gallons per minute per cubic foot of resin is maintained during this operation. Amino acids and amides are adsorbed by the resin in exchange for hydroxyl groups which, upon being freed, unite with the extract making the effluent strongly alkaline (pH 10.5–12.5). The extract is continuously passed through the resin column at the specified flow rate until the effluent falls below pH 10.0. At this point, the capacity of the resin for adsorbing amino acids and amides is exhausted and significant quantities of these compounds appear in the effluent as "leakage." Generally, however, 40 to 60 gallons of extract can be treated per cubic foot of resin. The exhausted resin contains all amino acids and amides having isoelectric points of pH 10 or below which were present in the liquid extract. The sugars, minerals, and other undesirable compounds which were also present in the extract are not adsorbed and pass through the resin column unaffected. They are discarded with the effluent, thus eliminating them from the remainder of the process and the finished product.

The exhausted resin column is rinsed briefly with 5 to 10 gallons of water per cubic foot at a flow rate of 2 gallons per minute per cubic foot in order to remove residual extract. The resin bed is then backwashed by the upward flow of fresh water through the column at a flow rate sufficient to cause a bed expansion equivalent to 140 to 170 percent of its normal volume. This serves to reclassify the resin bed according to particle size and also to remove any insoluble materials which have accumulated in the column during the exhaustion step. The adsorbed amino acids and amides which are contained on the resin column are unaffected by this treatment.

After the exhausted resin column is freed of impurities by rinsing and then reclassified by backwashing, the adsorbed amino acids are washed from the column and recovered by passing a dilute solution of a mineral acid, such as hydrochloric or sulfuric, downwardly through the resin bed. In the case of hydrochloric acid, the preferred washing agent, the eluant is 0.5 to 1.0 normal with respect to hydrochloric acid (2 to 4% by weight HCl). The eluant is strongly acidic, having a pH ranging from 0.5 to 1.5. Ten to forty gallons of acid are required to remove the amino acids and amides adsorbed on one cubic foot of the anion exchange resin. The flow rate for elution of the resin is 0.5 to 1.5 gallons per minute per cubic foot.

The strongly acidic (pH 0.5 to 1.5) effluent from the column during this operation is collected in a suitable corrosion resistant vessel or tank. It is yellow to orange in color and contains no insoluble or suspended solids.

The anion exchange resin, after completion of the elution operation, is rinsed with water, reclassified by backwashing and then regenerated to the hydroxyl form by treatment with caustic alkali according to specifications prescribed by the manufacturer. Repeated use is thus made of the same resin.

The strongly acidic solution of amino acids and amides recovered from the anion exchange column is transferred to a glass lined or other suitable corrosion resistant vessel where it is mixed with the purified protein recovered previously in the process by heat coagulation. The mixture formed exhibits a pH of 0.5 to 1.5. The reaction vessel is closed and its contents heated by steam or other suitable means to a temperature between about 115° C. and about 170° C. (10–100 p.s.i.g. steam pressure). Heating is continued for 18 to 24 hours at the lower temperatures and to a maximum of 3 to 5 hours at temperatures approaching 170° C. and pressure of 100 p.s.i.g. The combination of heat, pressure, and acid results in the hydrolysis or decomposition of the proteins to their component amino acids. The quantity of hydrochloric acid present in the anion exchange column eluant is sufficient to catalyze the hydrolysis reaction and there is no need for adding additional acid to the hydrolysis mixture. The hydrochloric acid thus serves the dual purpose of removing the amino acids and amides from the exchange resin and of catalyzing the protein hydrolysis.

The crude protein hydrolysate solution recovered after hydrolysis is deep red in color and contains small quantities of a dark colored flocculent precipitated termed "humin." It is composed of decomposition products of certain amino acids which are formed during acid hydrolysis of proteins. The solution is highly acidic, the concentration of mineral acid being one-third to one-half of that used in the original eluting solution for recovering adsorbed amino acids and amides from the strongly basic anion exchange resin. (The apparent loss of acid in the solution is due to adsorption on the anion exchange column and neutralization by ammonia liberated during hydrolysis.)

The crude protein hydrolysate solution is cooled to a temperature of from about 20 to about 40° C. in a suitable apparatus and then filtered to remove the insoluble humin precipitate. Filtration is carried out in the presence of a filter aid preferably of the diatomaceous silica type, such as Celite or Hy-Flo Supercel manufactured by Johns-Manville Corp., Philadelphia, Pennsylvania, and the Dicalite series manufactured by the Great Lakes Carbon Corporation, Chicago, Illinois. The clarified filtrate is deep red in color and has a pH value of 1.0 to 2.0.

As stated previously, the concentration of mineral (hydrochloric) acid in the hydrolysate solution is one-third to one-half that of the original eluant. Thus it ranges from 0.2 to 0.5 normal. In order to obtain a finished product which is neutral and free of residual mineral acid and yet also essentially free of inorganic salts, it is necessary to remove the hydrochloric acid without introducing any contaminating ions into the solution. In the present invention, this is accomplished in the following manner.

Certain weakly basic anion exchange resins have the specific ability of adsorbing whole molecules of mineral acids from dilute solutions thereof, thereby effectively neutralizing the acidity without the formation of the usual chemical salts which accompany the neutralization of an acid with a base. Typical resins capable of this function are Amberlite–IR–45, a weakly basic anion exchanger based on a polystyrene matrix with polyamine functional groups, manufactured by Rohm and Haas Company, Philadelphia, Pennsylvania; Dowex 3, a weakly basic styrene-divinyl-benzene copolymer containing polyalkylamine functional groups, manufactured by the Dow Chemical Company, Midland, Michigan; and Duolite A–7, a high polymer matrix type weakly basic resin containing primary, secondary, and tertiary amine groups as the functional centers. The latter resin is manufactured by the Chemical Process Company, Redwood City, California.

In practice, the highly acidic, crude protein hydrolysate solution is passed downwardly through a column of a weakly basic anion exchange resin, such as those described above, which has previously been converted to the hydroxyl or free base form by treatment with dilute caustic alkali. The flow rate of solution passing through the column is maintained at 1.0 to 2.0 gallons per minute per cubic foot of resin. The initial pH value of the effluent solution drops gradually until the resin is exhausted with respect to its capacity for adsorbing more mineral acid. The effluent pH at this point is 3.0 to 4.0. (The acidic nature of the final effluent is due to the presence of significant quantities of the acidic amino acids, glutamic, and aspartic and not to the presence of mineral acid which has not been adsorbed by the anion exchange resin.) The pH of the pooled column effluent is 4.0 to 5.5. It is essentially free of all hydrochloric acid. The color of the mineral acid-free hydrolysate solution is unchanged over that of the original crude material obtained immediately after hydrolysis.

Depending upon the concentration of mineral acid in the crude hydrolysate solution, from 30 to 70 gallons can be deacidified by one cubic foot of resin (Amberlite IR–45).

The exhausted resin can be readily converted or regenerated to the hydroxyl form for repeated use by means of standard techniques specified by the manufacturer.

As stated above, the mineral acid-free protein hydrolysate solution remains highly colored after deacidification. The color is due to soluble complex organic ions formed before and turning hydrolysis. To avoid carrying these colored products through to the finished product and thus introducing an undesirable appearance, it is necessary to remove the colored ions without effecting any change in the composition or amino acid balance of the final dried product. Again, a very efficient method for this has been found through the medium of ion exchange.

Certain specialized synthetic resins are available which have the ability of adsorbing colored organic ions from aqueous solutions such as that represented by the deacidified protein hydrolysate solution. Typical resins suitable for this purpose are Permutit DR, a special resin manufactured by the Permutit Company, New York, New York, and Duolite S–30, the same general type of resin manufactured by the Chemical Process Company, Redwood City, California. Neither company reveals the composition or chemical structure of the decolorizing resin.

The colored protein hydrolysate solution is passed through a column of the decolorizing resin (regenerated to the hydroxyl form) at a flow rate equivalent to 1.0 to 2.0 gallons per minute per cubic foot of resin. The effluent is colorless to very pale yellow in color and is generally faintly turbid. The effluent pH is 5.0 to 7.0. This treatment removes 80 to 100 percent of the colored ions present. The treatment does not affect the balance or content of amino acids in the finished product.

The capacity of the decolorizing resin varies widely due to differences in the quantity or characteristics of the colored ions present in the hydrolysate solution. Generally 80 to 120 gallons of deacidified solution is decolorized by one cubic foot of resin (Permutit DR).

This final ion exchange treatment yields a colorless, mineral acid-free solution of the finished protein hydrolysate. The solution, however, is very dilute, the solids concentration ranging from 0.3 to 0.8 percent. Recovery of the hydrolysate in solid form requires preliminary concentration of this dilute solution.

Concentration is accomplished by evaporating or distilling the dilute liquor under reduced pressure to a volume of 2 to 8 percent of the original. This operation is carried out under pressure which is reduced sufficiently to maintain a solution boiling point of 45 to 65° C. (60–160 millimeters absolute pressure—23–28 inches of vacuum are required.) The final concentrate is obtained as a pale-straw yellow colored turbid liquid with a pH of 5.0 to 6.5. The solids content of the concentrate is 4 to 40 percent by weight.

Recovery of the finished solid protein hydrolysate is accomplished by evaporating the liquid concentrate to dryness in a manner which will prevent decomposition of the heat sensitive amino acids. This is preferably carried out by spray drying, a technique which yields a uniform, finely divided product. Alternately, the various forms of vacuum drying may be used. These yield a product which is more granular in texture than the spray dried material.

The finished product is a tan, crystalline hygroscopic solid. It is obtained in yields of 0.5 to 1.0 percent by weight of the original potatoes or raw waste used. Basic analysis of the finished product yields the following:

| | Percent |
|---|---|
| (a) Total nitrogen | 12–14 |
| (b) Alpha-amino nitrogen | 11–12 |
| (c) Ammonia nitrogen | 1–2 |
| (d) Inorganic salts | 3–7 |

The approximate content of individual amino acids in the finished product is as follows:

| | Percent |
|---|---|
| Valine | 14 |
| Serine | 14 |
| Alanine | 9 |
| Proline | 8 |
| Leucine | 5 |
| Glutamic acid | 6 |
| Aspartic acid | 5 |
| Isoleucine | 4 |
| Threonine | 4 |
| Arginine | 3 |
| Methionine | 3 |
| Phenylalanine | 2 |
| Lysine | 2 |
| Glycine | 2 |
| Tyrosine | 1 |
| Cystine | 0.5 |
| Histidine | 0.5 |

The concentration of individual amino acids in the finished product will vary due to inconsistencies in the protein and amino acid content of the potatoes or raw waste used.

As an alternative of the present invention, the process may be modified to yield a similar material at reduced production costs. Such modification involves elimination of the amino acid and amide recovery with a strongly basic anion exchange resin. In this modification, the supernatant extract remaining after removal of the heat coagulated protein is discarded. The protein, after purification as described, is transferred directly to the hydrolysis vessel. Water and a sufficient quantity of concentrated hydrochloric acid are added to make the suspension 0.25 to 0.50 normal with respect to HCl. Hydrolysis, cooling, filtration, deacidification, decolorization, concentration, and final drying are carried out in the same manner described previously.

The finished product is obtained in yields of 0.4 to 0.8 percent by weight of the original potatoes or waste used. The basic analysis of the finished product obtained by this modification of the invention is essentially the same as that obtained from the unmodified process. Similarly, the typical amino acid analyses are unchanged.

The following examples illustrate the mode of operation of the process but are not to be construed as limiting the invention.

*Example I*

Twenty kilograms of whole potatoes (Russet variety) were macerated in a commercial size Waring Blendor in the presence of deionized water at a ratio of 1.4 kilo. of potatoes per liter of water. The slurry thus formed (about 40 liters) was separated in a laboratory size basket-type centrifuge containing a 100 mesh stainless steel screen liner. The solid cake retained by the liner was discarded.

The crude liquid extract (about 30 liters volume) was deep red in color due to enzymatic and oxidative reactions which occur in all potato tissue which is exposed to air. It had a pH of about 5.5.

The extract was transferred to a jacketed vessel and heated at atmospheric pressure to a temperature of 85° C. The proteins present in the extract separated as a heavy, insoluble coagulated precipitate. The extract was then transferred while hot to a stainless steel holding tank of about 15 gallons capacity. The protein precipitate settled out upon cooling and the supernatant liquid was siphoned off into a second holding tank.

The heavy protein slurry remaining after siphoning off the supernatant liquid (about 4 gallons volume) was diluted with about 10 gallons of tap water containing about 100 milliliters of concentrated hydrochloric acid. The presence of this quantity of acid produced a suspension of about pH 2.0. The acidic nature of the wash promoted more rapid settling of the protein precipitate and aided in dissolving occluded salts which were contained in the protein floc. After the protein had settled, the supernatant wash was drawn off and discarded. Washing in this manner was repeated a total of four times. The final recovery of heavy protein slurry (approximately 15 liters) (4 gallons) was set aside in a separate holding tank for the hydrolysis phase of the process which will be described presently.

The original supernatant extract after separation of the coagulated proteins was deep red in color and exhibited a pH of about 5.5. It occupied a volume of about 18 liters. It contained free amino acids and amides which were present in the original fresh potatoes used, in addition to significant quantities of sugars, mineral salts, and other components of potatoes which, if present in the finished protein hydrolysate derived from this process, would promote the formation of undesirable colors and flavors and generally reduce the quality of the material.

The extract was passed through a column of a strongly basic anion exchange resin, Dowex 1–X7.5, which had been previously converted to the hydroxyl or free base form by treatment with dilute sodium hydroxide according to specifications of the manufacturer. The resin column used in this work was contained in a section of Pyrex glass pipe 4 feet in length with an inside diameter of 3 inches. The resin bed had a depth of about 24 inches. Its volume was 0.088 cubic foot. Suitable attachments to the column permitted complete in-place cycling operations of the resin.

The flow of the potato extract through the anion exchange resin was maintained at a rate equivalent to 2 gallons per minute per cubic foot of resin. The pH of the initial portion of the column effluent (after removal of water voids) was 12.5. The final effluent after the entire sample of extract had passed through the resin exhibited a pH of 10.4. The entire effluent from the column was discarded since it contained only those potato constituents which are not wanted in the finished product. All amino acids and amides present in the original extract are quantitatively adsorbed on the resin with the exception of arginine. This amino acid is only partially adsorbed because its isoelectric point is higher than pH 10.

The resin column containing the adsorbed amino acids was backwashed with tap water for about 20 minutes at a flow rate equivalent to a 50 to 60% expansion of the bed. During backwashing, a dark colored insoluble precipitate which formed on the column during exhaustion was removed. Backwashing also served to reclassify the resin particles according to size, the larger ones moving toward the bottom of the resin bed while the finer particles made up the upper portions of the bed. After backwashing, the resin bed was allowed to settle into place and then rinsed with about 4 liters of deionized water.

The amino acids and amides which remained adsorbed on the resin during the backwashing and rinsing operations were removed by passing 8.3 liters of 0.5 normal hydrochloric acid through the resin column at a flow rate equivalent to 1 gallon per minute per cubic foot. The highly acidic effluent (pH 0.7) was collected in a large glass storage flask. The column was rinsed with about 1 volume (2.4 liters) of deionized water to recover small quantities of residual eluting acid which remained in the resin bed. The rinsings were added to the original effluent. The total volume of the mixture was about 10 liters (2.6 gallons).

The amino acid eluant and the heavy slurry of purified heat coagulated protein which had been recovered previously from the original potato extract were combined and thoroughly mixed. The thin slurry (pH 0.8) was transferred to a glass lined jacketed reactor of about 5 gallons (19 liters) capacity. Because of the highly acid nature of the thin slurry, further addition of mineral acid to promote hydrolysis of the proteins present was unnecessary.

Hydrolysis of the proteins was accomplished by sealing the reactor and then heating its contents with steam at 10 p.s.i.g. pressure (115° C.) for 24 hours with constant stirring of the reaction mixture.

At the completion of the period, the reaction vessel and its contents were allowed to cool nearly to room temperature (30–40° C.) before the seal was opened. The crude protein hydrolysis solution from the reactor was dark red-brown in color and contained a dark colored insoluble precipitate known as humin which is formed from the decomposition of certain amino acids, notably tryptophane, during acid hydrolysis. The concentration of free hydrochloric acid in the hydrolysed mixture was equivalent to about 0.2 normal.

After cooling completely to room temperature, the crude hydrolysate was filtered with suction through filter paper on a large Buechner funnel in the presence of Hy-Flo Supercel Filteraid to remove the humin precipitate.

The clarified deep red filtrate (volume about 19 liters) was passed through a column of Amberlite IR–45, a weakly basic anion exchange resin, which had been previously regenerated to the hydroxyl or free base form with dilute sodium hydroxide according to specifications of the manufacturer. The flow rate of filtrate through the Amberlite IR–45 column was maintained at 1.5 gallons per minute per cubic foot of resin. The volume of the resin bed was about 0.1 cubic foot and was contained in a column apparatus similar to that described for Dowex 1–X7.5. The mineral acid (hydrochloric acid) which was contained in the crude hydrolysate solution was quantitatively adsorbed by the IR–45 resin yielding an effluent having a pH value of 5.5.

The red-orange colored effluent was passed directly through a second ion exchange column containing about 0.05 cubic foot of Permutit DR decolorizing resin. Complete removal of colored ions from the hydrolysate solution was realized by this treatment and the effluent from the Permutit DR column was water-white in color. No change was observed in the pH of the colorless effluent as compared with the colored influent solution. The volume was about 18 liters.

The decolorized and deacidified protein hydrolysate solution was concentrated by distilling under reduced pressure (700 millimeters or 27.6 inches of vacuum) in a glass and stainless steel Precision Laboratory Evaporator to a volume of about 600 ml. (about 3% of the original volume). The concentrate was straw yellow in color and exhibited a pH of 5.8. The solids content was about 17% by weight.

The yield of dried finished product was determined by evaporating small aliquots of the concentrate to dryness as thin films on glass plates at 60° C. The calculated yield on a total recovery basis was 110 grams or 0.55% of the original potatoes used (20 kilograms).

Analysis of the dried hydrolysate revealed the following:

|  | Percent |
|---|---|
| (a) Inorganic salts (as non-combustible ash) | 4.43 |
| (b) Total nitrogen | 13.56 |
| (c) Ammonia nitrogen | 2.93 |
| (d) Alpha-amino nitrogen | 10.63 |

Single directional filter paper chromatography revealed the presence of the following amino acids in the dried protein hydrolysate: aspartic acid, glutamic acid, lysine, glycine, asparagine, threonine, arginine, histidine, valine, methionine, leucine, and phenylalanine. The presence of at least two other amino acids unidentified by this method of analysis was also shown.

The remainder of the concentrated protein hydrolysate solution, after removal of the aliquot from which the above analyses were made, was spray dried in a gas-fired, indirectly heated Bowen laboratory spray drier. A light tan, free-flowing powder was obtained. The analysis of this material was the same as that cied above for the air-dried aliquot.

*Example II*

Twenty kilograms of whole potatoes (Kennebec variety) were macerated in the presence of water in the same manner described in the foregoing example. The crude liquid extract was recovered by centrifuging and then heated to 90° C. to coagulate the proteins.

The protein precipitate was separated and purified by washing with acidified water in the same manner described in the first example. The purified protein slurry was finally transferred to a jacketed reactor in preparation for hydrolysis.

The amino acids and amides contained in the protein-free extract were recovered as described in Example I by adsorbing them on Dowex 1–X7.5, a strongly basic anion exchange resin in the hydroxyl form. After backwashing and rinsing the resin bed, the adsorbed amino acids and amides were eluted with 8.3 liters of 0.5 normal hydrochloric acid.

The acidic amino acid effluent was united with the protein slurry in the jacketed reactor and the mixture was heated with 10 p.s.i.g. steam at 115° C. for 24 hours.

After cooling and filtering the crude dark-colored hydrolysate solution, excess hydrochloric acid was removed by treatment on a weakly basic anion exchange resin, Amberlite IR–45, as described in the first example. Deacidification was followed by decolorization on a column of Permutit DR, a specialized decolorizing resin.

The neutral, colorless hydrolysate solution was then concentrated by distilling under reduced pressure to a volume of about 5% of the original. An aliquot of the concentrate was air-dried at 60° C. to obtain yield data and preliminary analysis. The remainder of the concentrate was spray-dried with a Bowen laboratory spray drier.

The analysis of the finished product was as follows:

|  | Percent |
|---|---|
| (a) Yield (raw material basis) | 0.73 |
| (b) Inorganic salts (as noncombustible ash) | 7.91 |
| (c) Total nitrogen | 12.62 |
| (d) Ammonia nitrogen | 2.75 |
| (e) Alpha-amino nitrogen | 9.87 |

Qualitative amino acid analysis of the finished product by single directional filter paper chromatography revealed the presence of the following: aspartic acid, glutamic acid, lysine, glycine, asparagine, threonine, arginine, histidine, alanine, valine, methionine, leucine, phenylalanine, and at least two other amino compounds which could not be definitely identified by this method of analysis.

Having described our invention, we claim:

1. A process for producing protein hydrolysate from an aqueous solution of the water-soluble components of potato material which comprises heating the solution to a temperature of from about 75° C. to about 95° C. to precipitate potato protein therefrom, separating the precipitated protein and contacting resultant protein-free liquid with a strongly basic anion exchanger to adsorb amino acids and amides on the exchanger, eluting the adsorbed amino acids and amides from the exchanger, with mineral acid, commingling resultant acidic effluent with at least a portion of said protein precipitate and subjecting the mixture to hydrolysis to hydrolyze the protein.

2. The process of claim 1 further characterized in that said mineral acid is hydrochloric acid.

3. A process for producing protein hydrolysate from an aqueous solution of the water-soluble components of potato material which comprises heating the solution to a temperature of from about 75° C. to about 95° C. to precipitate potato protein therefrom, separating the precipitated protein and contacting resultant protein-free liquid with a strongly basic anion exchanger to adsorb amino acids and amides on the exchanger, eluting the adsorbed amino acids and amides from the exchanger with mineral acid, commingling resultant acidic effluent with at least a portion of said protein precipitate and subjecting the mixture to hydrolysis to hydrolyze the protein, separating mineral acid and colored bodies from the resultant hydrolysate, and recovering the thus purified hydrolysate.

4. A process for producing protein hydrolysate from an aqueous solution of the water-soluble components of potato material which comprises heating the solution to a temperature of from about 75° C. to about 95° C. to precipitate potato protein therefrom, separating the precipitated protein and contacting resultant protein-free liquid with a strongly basic anion exchanger to adsorb amino acids and amides on the exchanger, eluting the adsorbed amino acids and amides from the exchanger with hydrochloric acid, commingling resultant acidic effluent with at least a portion of said protein precipitate and subjecting the mixture to hydrolysis to hydrolyze the protein, contacting the resultant hydrolysate with a weakly basic anion exchanger to removed hydrochloric acid therefrom and then with a decolorizing resin, and recovering the thus purified hydrolysate.

5. A process for producing protein and protein hydrolysate from an aqueous solution of the water-soluble components of potato material which comprises heating the solution to a temperature of from about 75° C. to about 95° C. to precipitate potato protein therefrom, separating the resultant protein precipitate from protein-free liquid, drying and recovering a portion of the precipitated protein, contacting the protein-free liquid with a strongly basic anion exchanger to adsorb amino acids and amides on the exchanger, eluting the adsorbed amino acids and amides from the exchanger with mineral acid, commingling resultant acidic effluent with another portion of said protein precipitate and subjecting the mixture to hydrolysis to hydrolyze the protein, and recovering the resultant hydrolysate.

6. A process for producing valuable products from an aqueous solution of the water-soluble components of potato material which comprises heating the solution to a temperature of from about 75° C. to about 95° C. to precipitate potato protein therefrom, separating the resultant protein precipitate from protein-free liquid, drying and recovering a portion of the precipitated protein, contacting the protein-free liquid with a strongly basic anion exchanger to adsorb amino acids and amides on the exchanger, eluting the adsorbed amino acids and amides from the exchanger with mineral acid, commingling resultant acidic effluent with another portion of said protein precipitate and subjecting the mixture to hydrolysis to hydrolyze the protein, contacting the resultant hydrolysate with a weakly basic anion exchanger to remove mineral acid therefrom and then with a decolorizing resin, and recovering the thus purified hydrolysate.

References Cited in the file of this patent

UNITED STATES PATENTS 2,666,080   Xander _____ Jan. 12, 1954

OTHER REFERENCES

Abernethy: Organic Chemistry, W. B. Saunders Co., Philadelphia (1949), pp. 265–66.

Block et al.: Amino Acid Handbook, Charles Thomas Pub., Springfield, Illinois (1956), pp. 16–20.